United States Patent
Reusch et al.

(10) Patent No.: US 8,612,190 B2
(45) Date of Patent: Dec. 17, 2013

(54) DERIVED SIMULATIONS FOR PLANNING SYSTEMS

(75) Inventors: Hans-Georg Reusch, Wiesenbach (DE); Volkmar Soehner, Sinsheim (DE); Andreas Wiethoff, Wiesloch (DE)

(73) Assignee: SAP AG, Walldorf (DE)

( * ) Notice: Subject to any disclaimer, the term of this patent is extended or adjusted under 35 U.S.C. 154(b) by 349 days.

(21) Appl. No.: 12/979,921

(22) Filed: Dec. 28, 2010

(65) Prior Publication Data

US 2012/0166164 A1    Jun. 28, 2012

(51) Int. Cl.
G06G 7/48    (2006.01)

(52) U.S. Cl.
USPC .......................................................... 703/6

(58) Field of Classification Search
USPC .......................................................... 703/6
See application file for complete search history.

(56) References Cited

U.S. PATENT DOCUMENTS

| | | | | |
|---|---|---|---|---|
| 5,347,653 | A * | 9/1994 | Flynn et al. | 707/695 |
| 5,504,879 | A * | 4/1996 | Eisenberg et al. | 1/1 |
| 7,159,216 | B2 | 1/2007 | McDonald | |
| 7,251,669 | B1 * | 7/2007 | Arora | 707/695 |
| 7,418,560 | B2 * | 8/2008 | Wintergerst | 711/147 |
| 7,599,841 | B1 * | 10/2009 | Koller et al. | 705/320 |
| 7,730,027 | B2 * | 6/2010 | Willenborg et al. | 707/610 |
| 7,836,028 | B1 * | 11/2010 | Agarwal et al. | 707/695 |
| 2003/0191795 | A1 | 10/2003 | Bernardin et al. | |
| 2004/0019891 | A1 | 1/2004 | Koenen | |
| 2005/0138013 | A1 * | 6/2005 | Walker et al. | 707/3 |
| 2006/0101391 | A1 * | 5/2006 | Ulke et al. | 717/107 |
| 2011/0154346 | A1 | 6/2011 | Jula | |
| 2012/0174117 | A1 | 7/2012 | Jula et al. | |

OTHER PUBLICATIONS

"Long-Term Planning (PP-MP-LTP)," 2001, SAP AG, pp. 1-50.*
Dennis G. Severance et al., "Differential files: their application to the maintenance of large databases," 1976, ACM Transactions on Database Systems, vol. 1, No. 3, pp. 256-267.*
"Versioned databases," 2004, IBM Corporation, three pages.*
Robert L. Rappoport, "File structure design to facilitate on-line instantaneous updating," 1975, SIGMOD '75 Proceedings of the 1975 ACM SIGMOD International Conference on Management of Data, pp. 1-14.*
Lee L. Gremillion, "Designing a Bloom filter for differential file access," 1982, Communications of the ACM, vol. 25, No. 9, pp. 600-604.*
C. Bauzer Medeiros et al., "Managing multiple representations of georeferenced elements," 1996, Proceedings of Seventh International Workshop on Database and Expert Systems Applications, pp. 364-370.*
"SAP Advanced Planning and Optimization 4.0 (SAP APO 4.0)", SAP AG, 2003, 20 pages.

(Continued)

Primary Examiner — Kamini S Shah
Assistant Examiner — Russ Guill
(74) Attorney, Agent, or Firm — Brake Hughes Bellermann LLP

(57) ABSTRACT

Baseline data may be generated, including copying selected data from a planning database. Modifying requests associated with changes to a derived simulation may be received, and affected entries within the baseline data that are affected by the modifying requests may be determined. Simulation entries may be stored within a derived simulation dataset, the simulation entries corresponding to the affected entries within the baseline data. A mapping may be provided between the simulation entries within the derived simulation dataset and the affected entries within the baseline data. The derived simulation may be provided in response to the modifying requests and based on the mapping.

15 Claims, 6 Drawing Sheets

(56) References Cited

OTHER PUBLICATIONS

Balla, et al, "Production Planning with SAP APO-PP/DS", Galileo Press, 2006, 43 pages.

Final Office Action for U.S. Appl. No. 12/981,143, mailed Mar. 19, 2013, 31 pages.

Non-Final Office Action for U.S. Appl. No. 12/981,143, mailed Oct. 18, 2012, 27 pages.

Broquedis, et al., "ForestGOMP: An Efficient OpenMP Environment for NUMA Architectures", International Journal of Parallel Programming, vol. 38, No. 5-6, May 30, 2010, pp. 418-439.

Broquedis, et al., "hwloc: A Generic Framework for Managing Hardware Affinities in HPC Applications", 2010 18th Euromicro International Conference on Parallel, Distributed and Network-Based Processing (PDP), Feb. 17, 2010, pp. 180-186.

Broquedis, et al., "Scheduling Dynamic OpenMP Applications over Multicore Architectures", May 12, 2008, OpenMP in a New Era of Parallelism, Lecture Notes in Computer Science, pp. 170-180.

Extended EP Search Report for EP Application No. 11004932.7, mailed Dec. 16, 2011, 9 pages.

\* cited by examiner

DERIVED SIMULATIONS FOR PLANNING SYSTEMS

TECHNICAL FIELD

This description relates to providing simulations using planning data.

BACKGROUND

Simulation techniques are available which enable an ability to forecast and analyze potential future events. For example, in business realms, simulation tools exist which enable business owners to forecast an effect of potential increases or decreases in sales, production capacity, and other business metrics which may vary over time. Similarly, in financial realms, simulation tools enable an ability to test assumptions about possible outcomes in equities markets. In yet another example, simulations may help to estimate the consequences of changing the setup of an existing supply chain, for instance, by changing the available production or transportation capacities, safety stocks, the number of distribution centers or other important components.

In general, such simulation tools may perform operations on a data set which includes factual or expected data representing a current or possible state of relevant factors and variables, to thereby generate expected values and outcomes for such data variables. In this way, simulations may be created which represent changes over time and/or a final outcome at a selected future time, so that a user of the simulation tools may consider such information when deciding how to proceed. For example, in the examples given above, users of appropriate simulation tools may discover that the simulation tools predict that, e.g., opening a new production facility will increase profits.

In many simulation scenarios, the data on which the simulations are to be based may be relatively small in amount, and/or may be relatively static over a relevant period of time. In many other simulation scenarios, however, it may occur that the data on which the simulations will be based is very large in size, and/or may vary in time during a relevant time period during which the simulations are to be executed. In the latter case(s), the requirement to use a very large amount of data to produce (e.g., to copy the data from a given source, in parts or completely) the simulation may require a producer or consumer of the simulation to wait an undesirably inconveniently long time for the simulation to be produced. Moreover, due to factors such as, e.g., changes in the underlying data set which may occur during execution of two or more related simulations, it may be difficult or impossible to obtain meaningful comparisons between the two or more simulations, particularly in cases where simulations are often maintained and/or used for many days or weeks, while related business data may change significantly each day. Thus, for these and other reasons, it may be difficult for simulation users to obtain satisfactory results within an acceptable timeframe.

SUMMARY

According to one general aspect, a system may include instructions recorded on a computer-readable medium and executable by at least one processor of one or more computing devices. The system may include a baseline generator configured to cause the processor to generate baseline data including copying selected data from a planning database. The system also may include an interface mapper configured to cause the at least one processor to receive modifying requests associated with changes to a derived simulation, determine affected entries within the baseline data that are affected by the modifying requests, store simulation entries within a derived simulation dataset, the simulation entries corresponding to the affected entries within the baseline data, and provide a mapping between the simulation entries within the derived simulation dataset and the affected entries within the baseline data. The system also may include a simulator configured to cause the at least one processor to provide the derived simulation in response to the modifying requests and based on the mapping.

According to another general aspect, a computer-implemented method may be implemented, in which baseline data may be generated, including copying selected data from a planning database. Modifying requests associated with changes to a derived simulation may be received, and affected entries within the baseline data that are affected by the modifying requests may be determined. Simulation entries may be stored within a derived simulation dataset, the simulation entries corresponding to the affected entries within the baseline data. A mapping may be provided between the simulation entries within the derived simulation dataset and the affected entries within the baseline data. The derived simulation may be provided in response to the modifying requests and based on the mapping.

According to another general aspect, a computer program product may be tangibly embodied on a computer-readable medium and may comprise instructions. When executed, the instructions may be configured to generate baseline data including copying selected data from a planning database, receive modifying requests associated with changes to a derived simulation, determine affected entries within the baseline data that are affected by the modifying requests, store simulation entries within a derived simulation dataset, the simulation entries corresponding to the affected entries within the baseline data, provide a mapping between the simulation entries within the derived simulation dataset and the affected entries within the baseline data, and provide the derived simulation in response to the modifying requests and based on the mapping.

The details of one or more implementations are set forth in the accompanying drawings and the description below. Other features will be apparent from the description and drawings, and from the claims.

DETAILED DESCRIPTION

Figure 1:
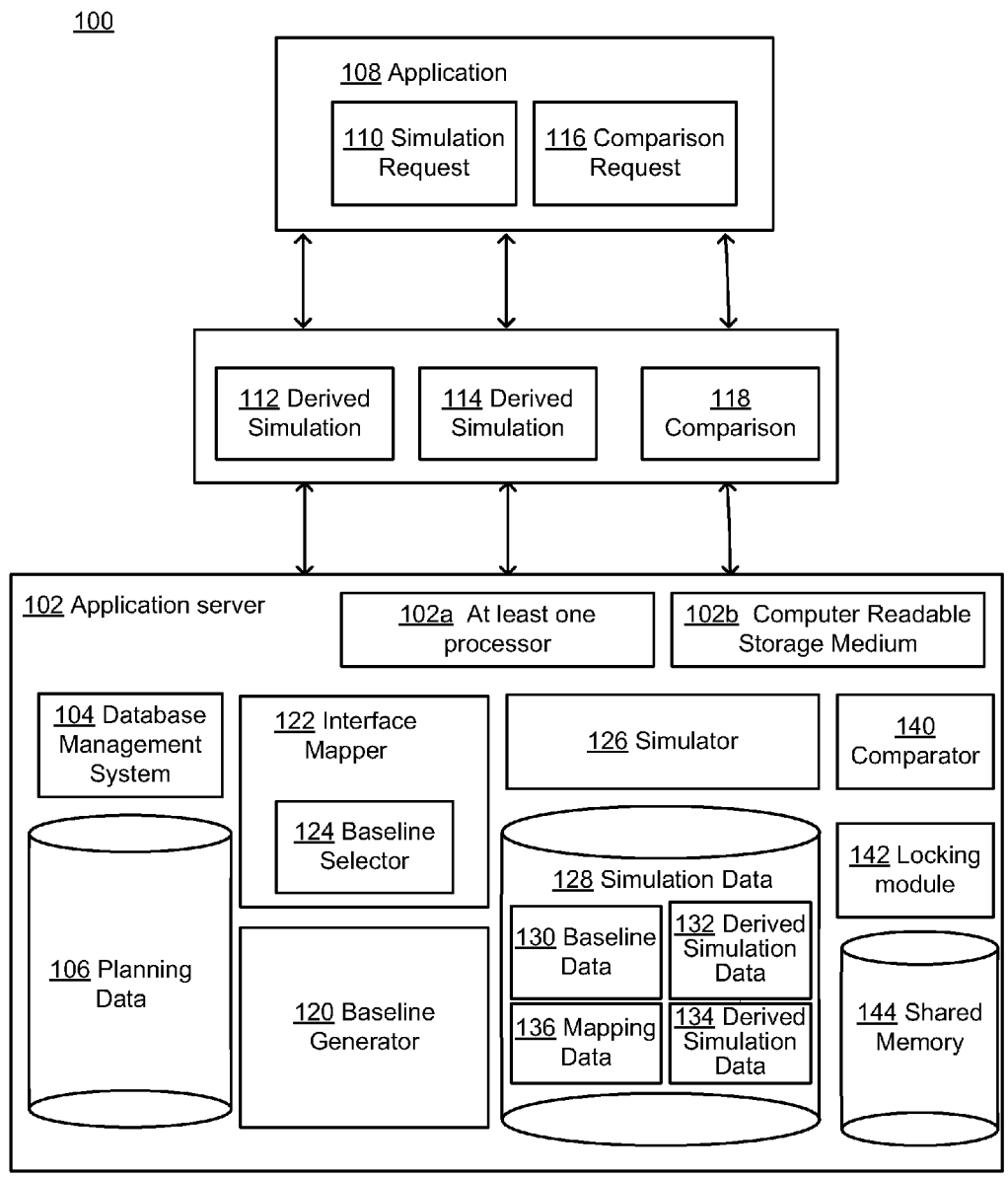
FIG. 1 is a block diagram of a system for providing derived simulations.

FIG. 1 is a block diagram of a system 100 for providing derived simulations. As described in detail herein, the system 100 enables users to obtain the benefits of quickly performing, and obtaining the results of, one or more simulations, even when using very large quantities of data to execute the simulations. Moreover, users of the system 100 of FIG. 1 may be enabled to perform meaningful comparisons between two or more implementations of such simulations. Other features and advantages of the system 100 of FIG. 1 are described in detail herein, or would be apparent to one of skill in the art.

In the example of FIG. 1, an application server 102 is illustrated as including a database management system (DBMS) 104 which is configured to interact with, and operate, one or more databases which include planning data 106. In other words, the database management system 104 may be understood to perform virtually any or all conventional database management functions with respect to the planning data 106. For example, the database management system 104 may be configured to create, update, modify, delete, access, query, or otherwise utilize desired portions of the planning data 106. In this regard, it may be appreciated that the database management system 104 may include one or more standard interfaces (e.g., application program interfaces, or API's) which are known to be useful in managing conventional databases. For example, the database management system 104 may use the standard query language (SQL), or subsets or variations thereof, in order to manage or otherwise utilize the planning data 106. The planning data 106 may itself be stored in any appropriate data or database structure. For example, the planning data 106 may be stored in a relational database, an object-oriented database, or any appropriate or desired database structure.

As may be appreciated from the above description, the planning data 106 may represent virtually any type of data which may be subject to, or which may benefit from, associated simulations based thereon. In many of the examples described herein, the planning data 106 may be described as related to business data which may be used by a business to simulate, and thereby predict, possible outcomes associated with one or more business decisions. Of course, it will be appreciated that such examples are merely for the sake of illustration, and are not considered to be limiting in any way. To the contrary, as referenced herein, the planning data 106 may represent financial data, a user's personal data, weather-related data, or virtually any data which may be stored which describes, or relates to, one or more systems which may change over time based on factors which are at least partly predictable.

Consequently, an application 108 may be understood to represent virtually any software application which may relate to, access, or otherwise utilize the planning data 106. For example, in business realms, the application 108 may represent a supply chain management (SCM) application, which is used to automate and analyze a production, transportation, distribution, and/or ultimate sale of one or more products. In these examples, the planning data 106 may store information related to such supply chain operations. In other examples, the planning data 106 may represent virtually all data associated with a particular business enterprise, so that two or more relevant applications may require access thereto. For example, the application 108, or another application, not shown, may include or represent a customer relationship management (CRM) application, or an enterprise resource planning (ERP) application, or virtually any other software application which may relate to operations of the business enterprise in question. In such cases, two or more such applications may require, or benefit from, simultaneous or overlapping access to some or all of the planning data 106.

During operations of the system 100, the application 108 may be utilized to submit simulation requests 110 to the application server 102. For example, in the examples referenced above, a user of the system 100 may utilize a graphical user interface (GUI) or other appropriate input mechanism of the application 108 in order to request a simulation which represents an outcome associated with an increase in products ordered by customers during an upcoming quarter or other defined time period. Then, the system 100 may provide, in response to the simulation request 110, one or more derived simulations 112, 114, where the derived simulations 112, 114 represent, from the perspective of the user of the application 108, substantially standard simulations requested and specified by the simulation request 110, for use thereof by the user of the application 108.

Reference to such simulations as "derived simulations" is explained and apparent from the below discussion of operations of the system 100. In general, however, it may be appreciated that such derived simulations 112, 114 may be provided in a fast and convenient manner, to thereby increase an enjoyment, efficiency, and/or productivity of the user. In this regard, as described and referenced in detail below, it may further be appreciated that the requests 110 may generally and conceptually represent one or more of a plurality of types of requests which may be submitted in conjunction with the derived simulations 112, 114. For example, as described, an initial request may be received which triggers creation and/or first use or viewing of, e.g., the derived simulation 112. Subsequently, the request(s) 110 may include viewing requests for viewing requested/desired aspects of the derived simulation. Additionally, or alternatively, the requests may include modifying requests which actively manipulate, change, or otherwise modify data associated with the derived simulation 112. Thus, in various described examples, the term request(s) may be specified herein as having an appropriate or corresponding one of the above meaning(s), or combinations thereof, or other similar or related meanings, as would be apparent.

Further in the example of FIG. 1, the application 108 may similarly be configured to receive comparison requests 116 from the user of the application 108 for submission to the application server 102, where the comparison request 116 may be understood to specify two or more of the derived simulations 112, 114, so that the user may be provided with a meaningful comparison 118 there between. As described in detail below, the system 100 is configured to generate and provide the derived simulations 112, 114 in a manner which is particularly suitable for providing meaningful and useful comparisons there between for the user of the application 108.

In particular, as shown in FIG. 1, a baseline generator 120 may be configured to receive the simulation request 110, and to copy a necessary subset of the planning data 106 for subsequent use thereof in generating the derived simulations 112, 114. That is, as described in detail below, the baseline generator 120 may be configured to obtain a relevant subset of the planning data 106, which thereafter serves as a common data set to be used in generating the two or more derived simulations 112, 114, even though, for example, the derived simulations 112, 114 may be generated at different points in time, and even though changes may occur within the relevant subset of the planning data 106 itself during the interim. Moreover, as described herein, operations of the baseline generator 120 and related operations of the application server 102 may be utilized to generate one or both the of the derived simulations 112, 114 virtually instantaneously in response to current or future simulation requests 110, so that a user of the application 108 is provided with the derived simulations 112, 114 within an acceptable timeframe.

More specifically, an interface mapper 122 may be configured to execute a mapping between baseline data from the baseline generator 120 and relevant simulation data of either or both of the derived simulations 112, 114. In this way, the system 100 may provide the derived simulations 112, 114 merely by storing changes between the baseline data from the baseline generator 120 and the actual simulation data associated with the derived simulations 112, 114, and relevant mappings there between. Specific detailed operations, and examples thereof, are provided below, e.g., with respect to FIGS. 2, 5, and 6, while specific examples of implementations and relevant aspects thereof, are provided below with respect to FIGS. 3 and 4.

Thus, during operation of the system 100, user of the application 108 may submit an initial simulation request 110 which explicitly or implicitly defines or identifies baseline data generated by the generator 120 from the planning data 106, and to thereafter serve as a common basis for future derived simulations. For example, an initial simulation request 110 may utilize a baseline selector 124 which explicitly or implicitly defines a subset of the planning data 106, so that the baseline generator 120 may proceed to execute a copy thereof. As may be appreciated from the above discussion, in scenarios in which the planning data 106 includes a very large amount of data, it may occur that the baseline generator 120 may require an initially large amount of time and computing resources to execute generation of baseline data from the planning data 106.

Thereafter, a simulator 126 may be configured to perform standard operations associated with executing simulations based on the defined data sets. In this regard, it may be appreciated that the simulator 126, by itself, includes many well known and conventional simulation functions, which are therefore not described here in detail except as may be necessary or helpful in understanding operations of the system 100.

Further in the example of FIG. 1, simulation data 128 is illustrated as including various types of data which may be related to the simulation request 110, the comparison request 116, the derived simulations 112, 114, and/or the comparison 118. In the illustration of FIG. 1, the simulation data 128 is shown as being stored separately from the planning data 106. Of course, it may be appreciated that the planning data 106 and the simulation data 128 may be stored in a common database, or in two or more databases which share the same database management system 104. Conversely, various data in either or both of the planning data 106 and the simulation data 128 may be stored in separate or different databases than those shown in the example of FIG. 1.

Consequently, with respect to the simulation data 128, it may be appreciated that the initial simulation request 110 from the application 108 may be associated with appropriate definition(s) for copying baseline data 130 from the planning data 106, by the baseline generator 120. Thereafter, the simulator 126 may execute simulation functions which would normally result in various alterations of, and/or additions to, the baseline data 130. However, in FIG. 1, the baseline data 130 need not be changed. Rather, such derived simulation data 132 may be stored within the simulation data 128, and is logically related to the underlying baseline data 130 by mapping data 136 that is determined by the interface mapper 122.

In other words, it may be understood that, together, the derived simulation 112 may be provided based on some or all of the baseline data 130, combined with changes thereto which are specific to the derived simulation 112 and stored separately as the derived simulation data 132, along with mappings between the derived simulation data 132 and baseline data 130. In this way, the derived simulation data 132 may be relatively minimal in quantity, even though the baseline data 130 may be very large in quantity. Similarly, the mapping data 136 generated by the interface mapper 122 in relating the derived simulation 132 to changes in the baseline data 130 may be relatively minimal in quantity relative to the baseline data 130 itself. Moreover, as referenced above, and as is apparent, it is thereby possible to maintain the baseline data 130 in its current form, without actually executing changes thereto in order to provide the derived simulation 112.

In operation, after copying of the baseline data 130 and receipt of the initial simulation request(s) 110, the derived simulation data 132 and the mapping data 136 may initially be created as empty containers, along with a corresponding identifier to differentiate the derived simulation 112 from other simulations and derived simulations. Then, a user of the application 108 may work within the context of the derived simulation 112 and may have the experience of, e.g., submitting viewing requests for viewing desired simulation data (if available), as well as submitting modifying requests for creating new data, updating existing baseline data or deleting existing baseline data. In reality, as described herein, such creations/updates/deletions or other modifications are implemented logically (as they occur) using the derived simulation data 132 and the mapping data 136, and stored over time, without affecting the underlying baseline data 130. The user may not be required to have any knowledge of the described data structure(s), and instead may simply be provided with a user experience in which the derived simulation is experienced essentially in real-time, even though the baseline data 130 may be very large in size and would normally require large amounts of time and computing resources to manipulate (i.e., the time and resources associated with creating another copy of the baseline data).

Further, a subsequent initial simulation request 110 may be received which causes generation of the second derived simulation 114. That is, in the example, the second/subsequent initial simulation request 110 may provide a modified set of parameters relative to the initial simulation request associated with the derived simulation 112. However, the second initial simulation request 110 may nonetheless be associated with a simulation by the simulator 126 that is based on the same baseline data 130 used to generate the first derived simulation 112. Therefore, because the baseline data 130 has already been produced previously in conjunction with production of the derived simulation 112, the simulator 126 and the interface mapper 122 may generate derived simulation data 134 as logically representing any alterations or additions to the baseline data 130, along with appropriate portions of the mapping data 136 which relate such alterations or additions of the derived simulation data 134 to the underlying baseline data 130. In this way, as with the derived simulation 112, the simulator 126 may produce the derived simulation 114 for use by user of the application 108 in a nearly instantaneous manner, so that the user may obtain immediate benefit of the derived simulation 114, while requiring minimal use of resources to do so, and without requiring actual changes to the baseline data 130.

Moreover, because the derived simulations 112, 114 are based on the same underlying baseline data 130, as referenced above, a comparator 140 may be configured to make meaningful and useful comparisons between the derived simulations 112, 114, for output as the comparison 118 in response to comparison request 116. That is, as referenced above, the comparison request 116 may specify a desired comparison between the derived simulations 112, 114, along with associated parameters for the comparison in question, and the comparator 140 may thereafter execute the desired comparison to obtain the comparison 118. Of course, in the simplified example of FIG. 1, the system 100 is illustrated as having only two derived simulations 112, 114. However, in actual implementations, it may of course occur that a relatively large number of derived simulations may be generated with respect to the same underlying baseline data 130. As a result, it may be appreciated that the comparison request 116 may be required to specify which of the many derived simulations should be subject to comparison, so that, for example, three or more derived simulations may be subject to various desired types of comparisons.

Further in the example of FIG. 1, a locking module 142 is illustrated as utilizing the shared memory 144 in order to execute one or more types of locking mechanisms in conjunction with various types of potential concurrent usages of the system 100, e.g., by two or more users or by multitasking programs used by one or more users. For example, it may occur that the application server 102 is a network application server which is available to two or more employees of a business enterprise. In such an example, it may occur that the two or more employees each have access to the planning data 106, e.g., may each be running instances of the application 108. In such a case, it may occur that the first user may utilize the techniques described herein to generate the derived simulation 112. However, it may be appreciated that the derived simulation 112 may not represent a static or unchanging outcome or output the system 100. For example, the first user may generate the derived simulation 112 based on a certain set of factors, and may wish to modify these factors over time during the first user's use of the derived simulation 112. At the same time, a second user may have concurrent access to the derived simulation 112. Consequently, there may be a need to restrict an ability of one or both users to make modifications to the derived simulation 112 while such concurrent usage exists.

Consequently, the locking module 142 may be configured to monitor such concurrent usages, and to create necessary entries within the shared memory 144 to avoid undesirable or unpermitted changes to the derived simulation 112. Specific detailed examples of operations of the locking module 142 and the shared memory 144 are provided below, e.g., with respect to FIG. 6.

As referenced above, the system 100 of FIG. 1 illustrates a simplified and/or conceptual example implementation for providing derived simulations 112, 114, and the comparison 118 there between. Of course, it will be appreciated that in various actual implementations of the system 100, many variations and additional details may be possible or required. For example, in the simulation data 128, the mapping data 136 is illustrated as being stored separately from, but in conjunction with, the baseline data 130 and the derived simulation data 132, 134. Of course, it may be appreciated that relevant portions of the mapping data 136 may be stored together with respective derived simulations 132, 134. Moreover, the example of FIG. 1 illustrates the shared memory 144 as being separate from the simulation 128 and the planning data 106. However, as referenced above, the various separate memories of the system 100 may be understood to represent one or more memories for storing desired in any manner which is appropriate or desired.

More generally, as shown, the application server 102 may be associated with, or include, at least one processor 102A, as well as a computer readable storage medium 102B. That is, as would be apparent to one of skill in the art, the application server 102 may represent one or more application servers, perhaps in communication with one another, and each perhaps including two or more processors. Similarly, each such application server may include, or may have access to, the computer readable storage medium 102B, which may be understood to be capable of storing executable codes/instructions which, when executed by the at least one processor 102A, causes the application server 102 to execute the various functions described herein. That is, the computer readable storage medium 102B may be understood to represent one or more computer memories which are configured to store either or both of the executable code for implementing the system 100, and/or the various types and quantities of data associated with the system 100 and used thereby to provide the various features and advantages described herein.

Figure 2:
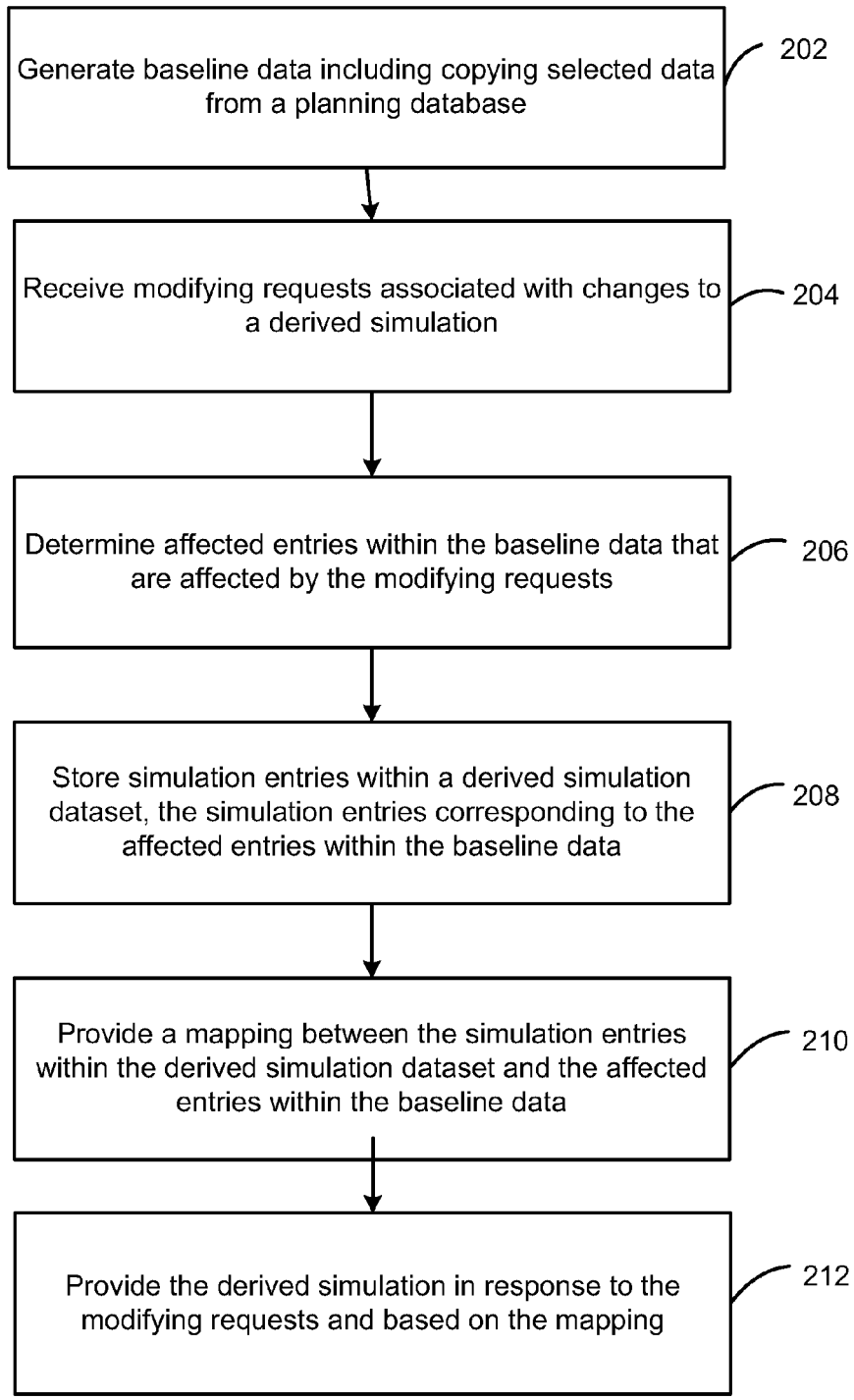
FIG. 2 is a flowchart illustrating example operations of the system of FIG. 1.

FIG. 2 is a flowchart 200 illustrating example operations of the system 100 of FIG. 1. In the example of FIG. 2, operations 202-212 are illustrated in a sequential order. However, it will be appreciated that such examples are non-limiting, and that the operations 202-212 of FIG. 2 may be performed in a different order than that shown, or may include additional or alternative operations not specifically illustrated in the example of FIG. 2. In other examples, operations of the flowchart 200 may be executed in a partially or completely overlapping or parallel manner, and one or more of the operations 202-212 may be omitted or replaced.

In the example of FIG. 2, baseline data may be generated including copying selected data from the planning database (202). For example, the baseline generator 120 may copy the baseline data 130 from the planning data 106. As described above, the baseline selector 124 may receive parameters or other input from the application 108 (or other source) which defines one or more subsets of the planning data 106 to be included within the baseline data 130. As described, the planning data 106 may include a large quantity of data, so that copying of some or all of such planning data for use as the baseline data 130 may be relatively time-consuming and resource-intensive process. Thereafter, in some example implementations, the baseline data 130 may be stored as read-only data which is not permitted to be modified by the user of the system 100 during use of the baseline data 130 in generating derived simulations 112, 114.

Modifying requests associated with changes to a derived simulation may be received (204). For example, the interface mapper 122 may receive one or more modifying simulation requests 110 which specify aspects of a desired derived simulation. Thus, in the example, the interface mapper 122, as just described, may be configured to receive some or all of the simulation request(s) 110. However, in this regard, and generally with respect to FIG. 1, it may be appreciated that although FIG. 1 illustrates a number of separate components or elements, any two or more of such components may have overlapping functionality, and may be partially or completely combined with one another into a smaller number of individual components. Conversely, elements of FIG. 1 which are illustrated as single, discrete elements may be functionally divided into two or more elements, as would be apparent. For example, the interface mapper 122 may be considered, in whole or in part, to be a sub-component of the simulator 126, and may thus receive the simulation request 110 in this context. In the example of FIG. 1, however, the simulator 126 is illustrated separately from the interface mapper 122, in order to distinguish conventional simulation functions of the simulator 126, which, as described, are not described here in detail. Similarly, it may be appreciated that either or both of the interface mapper 122 and the simulator 126 may be implemented in conjunction with database management functions of the database management system 104. Again, however, the database management system 104 is illustrated separately in order to convey its inclusion of conventional database management functionality.

In the example of FIG. 2, as referenced above, the generation of baseline data (202) is illustrated as occurring sequentially prior to receipt of the request 110 for a derived simulation. For example, a user of the application 108 may initially request generation of the baseline data 130 during a time of reduced use of the application server 102 (e.g., overnight). Then, upon accessing the application server 102 the following morning, the user may submit one or more of the simulation requests 110 with respect to the previously generated baseline data. In other examples, however, as also referenced, the simulation request 110 may be received in conjunction with a specification, and generation, of the baseline data 130. For example, the user may initially request a derived simulation which necessitates associated generation of underlying baseline data. Of course, in situations where the baseline data 130 has previously been generated, as described herein, subsequent derived simulations may be generated virtually instantaneously, whereas generation of a derived simulation in conjunction with an initial generation of the baseline data 130 may be limited in time by the copying of the baseline data 130.

Initially, the derived simulation may be associated with an empty container created for that purpose, as well as an identifier to distinguish the derived simulation from other derived simulations. Similarly, as described herein, an empty container may be created for mapping data used to relate derived simulation data with underlying baseline data.

Further in FIG. 2, affected entries within the baseline data that are affected by the modifying requests may be determined (206). For example, the interface mapper 122 may determine that, in the derived simulation 112, an entry of the baseline data 130 may be required to be read, deleted, replaced, or otherwise modified. In general, such affected entries may represent only a small percentage of the overall quantity of data included within the baseline data 130.

Simulation entries may be stored within a derived simulation dataset, the simulation entries corresponding to the affected entries within the baseline data (208). For example, the interface mapper 122 may store the derived simulation data 132 associated with the derived simulation 112. Again, the derived simulation data 132 may represent data entries which are related to underlying affected entries within the baseline data 130.

A mapping between the simulation entries within the derived simulation dataset and the affected entries within the baseline data may be provided (210). For example, the interface mapper 122 may provide the mapping data 136 which relates simulation entries within the derived simulation data 132 to underlying affected entries within the baseline data 130. As described above, the mapping data 136 is illustrated separately from either/both of the baseline data 130 and the derived simulation data 132, for clarity of illustration. However, it may be appreciated, as described in example implementations herein, that the mapping data for each particular simulation entry and associated affected entry may be stored directly in association therewith. Consequently, the mapping data 136 may provide a forward or reverse lookup between mapped entries within the baseline data 130 and the derived simulation data 132.

The derived simulation may be provided in response to the modifying requests, based on the mapping (212). For example, the simulator 126 may provide the derived simulation 112 based on the baseline data 130 of the derived simulation 132 and the mapping data 136.

As described herein, the derived simulation 112 may thus be provided to the user of the application 108 nearly in real-time, in situations where the baseline data 130 is already available at a time of receipt of the simulation request(s) 110. That is, the user may work with the derived simulation over time (e.g., may submit a plurality of requests over time) related to various scenarios that the user wishes to analyze using the derived simulation. The user may thus be provided with information regarding such simulated scenarios as the user submits the modifying requests, while the system 100 of FIG. 1 logically maintains the relevant necessary data with respect to the underlying baseline data 130.

In the example of FIG. 2, discussion is primarily given with respect to modifying requests (e.g., requests to create, update, delete, or otherwise change or modify an identified entry). However, it may be appreciated that additionally, or alternatively, viewing requests may be received in cases where the user wishes to view a desired aspect or entry associated with a particular derived simulation, and in which the existing mapping is used to accommodate and/or respond to such viewing requests.

The user of the application 108 also may submit a second initial simulation request(s) 110 with respect to the same baseline data 130, to thereby, again nearly instantaneously, receive the derived simulation 114. As described, because the derived simulations 112, 114 are based on, and defined relative to, the common underlying baseline data 130, comparison request 116 may be submitted to the comparator 140 to thereby generate a desired comparison 118 between the derived simulations 112, 114 at a desired point in time and/or for a given scenario in each derived simulation.

Figure 3:
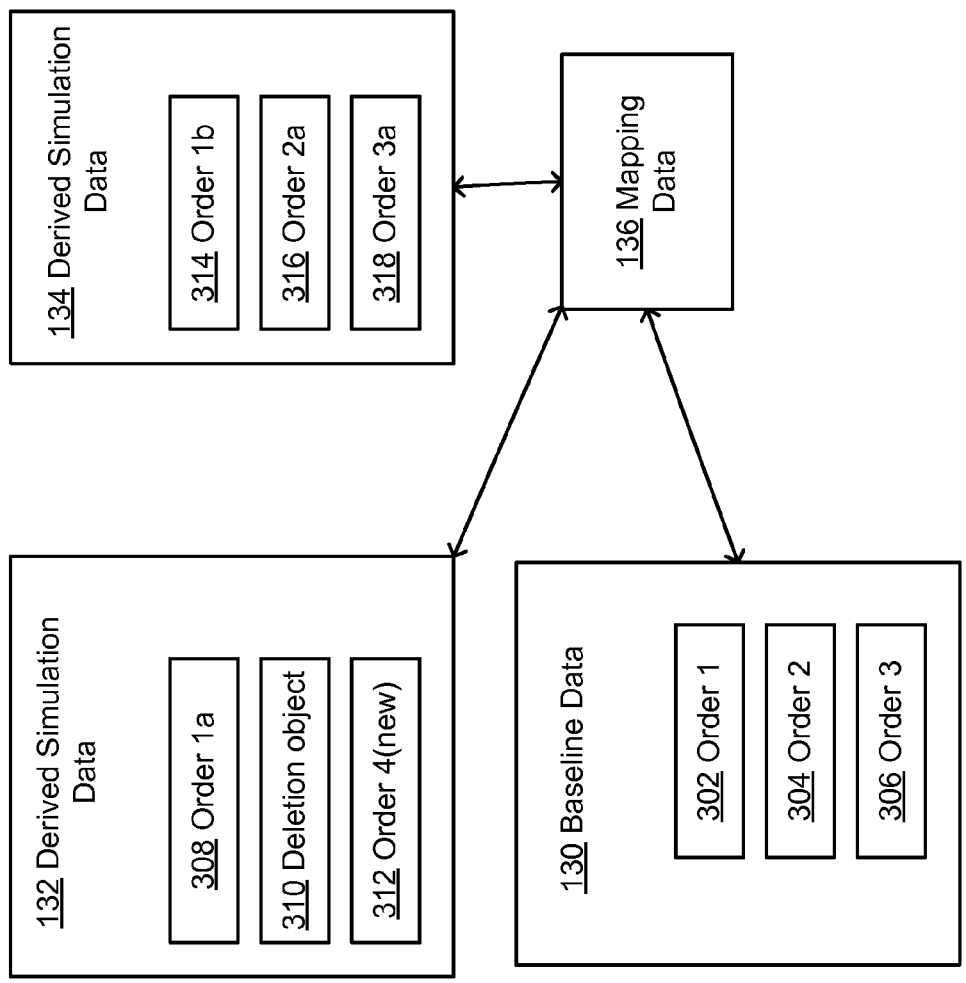
FIG. 3 is a block diagram illustrating relationships between simulation data used in the system of FIG. 1.

FIG. 3 is a block diagram of example representations of the baseline data 130, the derived simulation data 132, 134, and the mapping data 136. For sake of example, a simplified scenario is considered in which the planning data 106 relates to a plurality of orders which have been, or may be, received from one or more customers. In the example, the user of the application 108 may thus represent an employee wishing to increase a total sales volume associated with the customer orders, and who is therefore interested in executing simulations which may be useful in accomplishing this goal.

Thus, in the simplified example of FIG. 3, the baseline data 130 is illustrated as including the first order 302, a second order 304, and a third order 306. Of course, each of the entries 302-306 may be associated with various types and extents of data that may be associated with customer orders, not all of which are specifically illustrated in the simplified example of FIG. 3.

In the simplified example of FIG. 3, derived simulation data 132 is illustrated as including, at a given point in time, a modified first order 308 (illustrated as order 1a compared to order 1 of the baseline data). Further, the derived simulation 132 is illustrated at the point in time as being associated with a deletion entry 310 associated with the second order 304. Further, a new, fourth order 312 is illustrated at the same point in time as being included within the derived simulation data 132.

In other words, FIG. 3 illustrates an example in which, in a requested simulation at a given point in time and in response to previously-received corresponding simulation requests, the first order 302 is modified, the second order 304 is deleted, the third order 306 is not affected, and the fourth order 312 is added. In other words, orders 302 and 304 represent affected entries within the baseline data 130, and the orders 308 and 310 represent simulation entries which are mapped thereto by mapping data 136. That is, it may be appreciated from the above discussion that the mapping data 136 may be used to map the modified first order 308 with the original first order 302, the empty/deleted entry 310 with the underlying second order 304, to recognize addition of the fourth order 312, and to reflect the fact that the third order 306 is not affected by the simulation request resulting in the derived simulation data 132.

In practice, then, when viewing the derived simulation 112 associated with the derived simulation data 132 and the baseline data 130 (and relevant portions of the mapping 136), the user of the application 108 may submit a request related to the second order 304. In the example, the user would be informed that in the derived simulation 112 at the relevant point in time, the second order 304 is non-existent. As may be appreciated, however, the second order 304 is not actually deleted from the baseline data 130. Rather, a logical representation of the simulated deletion is included for purposes of the derived simulation 112. Similarly, requests from the user associated with the derived simulation 112 and directed toward the (modified) first order and/or the additional fourth order may be appropriately directed by the mapping data 136 with respect to the derived simulation data 132. Meanwhile, a request from the user of the application 108 related to the third order 306 may be serviced by direct access to the order 306 within the baseline data 130, since the third order 306 was not affected by the requested derived simulation (i.e., represents an example of non-affected entries within the baseline data with respect to the derived simulation data 132, with respect to which storing of an additional simulation entry and associated mapping data is not necessary).

Further, in the example of FIG. 3, the derived simulation data 134 associated with the derived simulation 114 is illustrated. In the example, it is assumed that the first order 302 is modified in a different or additional manner than described above with respect to the derived simulation data 132 at a point in time that is the same or different point in time as that considered above, and is therefore stored as a (differently) modified first order 314 (illustrated in FIG. 3 as modified first order 1b). Further, in the example of the derived simulation data 134, the second order 304 is modified to obtain a modified second order 316 (illustrated in the example of FIG. 3 as modified second order 2a). Still further, and similarly, the third order 306 is illustrated as being modified for purposes of the derived simulation 114, and therefore stored as modified third order 318 (illustrated in the example of FIG. 3 as modified third order 3A).

Thus, in the example, the user of the application 108 accessing the derived simulation 114 may submit requests for information related to any of the first, second, or third orders associated with the baseline data 130. In the example, the mapping data 136 will therefore return to the user of the application 108 information from the appropriate data entries 314, 316, or 318, rather than underlying baseline data entries 302, 304, 306, which are themselves not valid with respect to the derived simulation 114.

It may thus be appreciated from the example of FIG. 3, in the above discussion of FIGS. 1 and 2, that the derived simulation data 132, 134 may be stored using a minimal amount of resources, as compared to resources used to store and access the baseline data 130. Moreover, it should be apparent that the comparator 140 may easily compare the derived simulation data 134 with the derived simulation data 132. For example, it may be observed to be straightforward to compare a relative difference in total sales volume between, for example, a summation of the orders 308 and 310 in the context of the derived simulation 112 as compared to a corresponding summation of orders 314/316 in the context of the derived simulation 114.

For example, it may occur that, in the simulations, resources associated with the underlying second order 304 are devoted completely to increasing a sales volume associated with the first order 302, so as to result in a non-existence of the second order 310, and then increased total of the modified first order 308. In contrast, the derived simulation data 134 may contemplate that at least some resources are associated with the modified second order 2a 316 of the derived simulation data 134. In this way, meaningful comparison may be made between an effect of resource allocation in the derived simulation 112 as compared to the derived simulation 114 with respect to the relevant sales orders.

Figure 4:
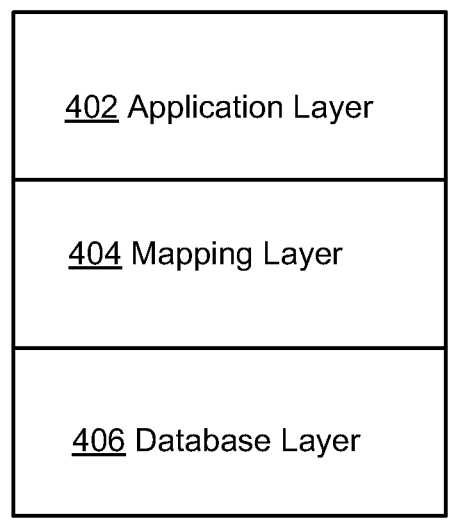
FIG. 4 is a block diagram illustrating example software layers that may be used in implementing the system of FIG. 1.

FIG. 4 is a block diagram 400 which represents operations of the system 100 of FIG. 1 using architectural layers 402, 404, 406. More specifically, as shown, FIG. 4 illustrates an application layer 402 which corresponds to operations which occur at a level of the application 108 of FIG. 1. Mapping layer 404 represents and includes the various mapping operations described above and associated with the interface mapper 122, the baseline generator 120, the comparator 140, and/or the locking module 142. The database layer 406 generally represents and includes database interactions and other operations associated with the database management system 104.

Thus, generally speaking, and as referenced above, conventional database systems, including conventional simulation systems, may include applications at an application layer which interact directly with database management functionality associated with the database at a database layer. For example, such applications may gain access to such data using an associated application programming interface (API), such as, for example, API's based on SQL statements such as those referenced above. Specific examples of such API's and associated functionality are provided in detail below, but may generally be understood to include, for example, uniquely identifying an object, item, or other entry of the database in question, the locking of database entries during mutual access, the creation of new entries or deletion of deleted entries, and modification of existing entries.

As described above, and as illustrated in the example of FIG. 4, the system 100 of FIG. 1 may effectively insert the mapping layer 404 between the application layer 402 and the database layer 406. That is, for example, creation and manipulation of derived simulations 112, 114 may be executed using modified or additional functions associated with the existing application and database layers, e.g., associated with the various API functionalities already existing in association with the application and database layers. It may be appreciated that in some example implementations, such modified functionality may be included (e.g., are coded within) the application 108 itself. In other example implementations, such as, for example, when the application 108 is a previously existing application which may be large and complex, the additional or modified API functionality may be included as an addition to, or in conjunction with, an existing application such as the application 108. In the latter examples, it may be appreciated that the functionality and advantages of the system 100 of FIG. 1 may be obtained for a plurality of different pre-existing applications, and/or with a minimal effort.

Thus, the mapping layer 404 may be understood to represent, for example, a modified or enhanced API for executing the derived simulations 112, 114, where the underlying or existing API may be used in conjunction therewith. For example, in the illustrative example of an object-oriented database, the modified or enhanced API may execute read operations for unchanged objects in the object containers of the baseline data 130, whereas read operations for changed objects may be directed to appropriate object containers within the derived simulation data, e.g., the derived simulation data 132. Similarly, changing or locking operations, or creating new objects, may be executed or modified by the enhanced API by creating new entries and appropriate containers belonging to the derived simulation data 132. Deletion of objects existing in the baseline data 130 may be mapped by the modified or enhanced API to created deletion entry objects in appropriate containers of the derived simulation data 132, thereby representing such deletions.

Thus, as described above with respect to FIGS. 1-3, the interface mapper 122 and associated mapping data 136 may be used to assign to each object from the baseline data 130 which is modified or deleted in the derived simulation data 132, the corresponding object or deletion entry object in the containers representing the derived simulation. Depending on the uniqueness of the data, such mapping may be realized, for example, by the mapping between identifiers of the original objects in the baseline data 130 and the corresponding changed entry objects and deletion entry objects in the derived simulation data 132.

As described above, the mapping data 136 may itself be persisted in order to protect the derived simulation (e.g., the derived simulation 112) from data loss, e.g., in the event of system crashes, shutdowns, or restarts. As may be understood from the above description, such persistent mapping may be realized by objects in object containers belonging to the derived simulation, e.g., within the derived simulation data 132. In this case, such mapping objects also may be used as lock representatives by the locking module 142, as described in detail below with respect to FIG. 6.

In such example embodiments, it is also possible that the mapping techniques support an efficient reverse lookup, e.g., finding a particular object or other entry belonging to the baseline data 130 based on a given change entry or deletion entry object belonging to the corresponding derived simulation data 132. For example, such an effect may be achieved by using a second mapping object whose identifier, (e.g., key) is associated with the identifier of the changed object or deletion entry object in question. Again, specific examples of such a reverse look-up are provided in detail, below.

Figure 5:
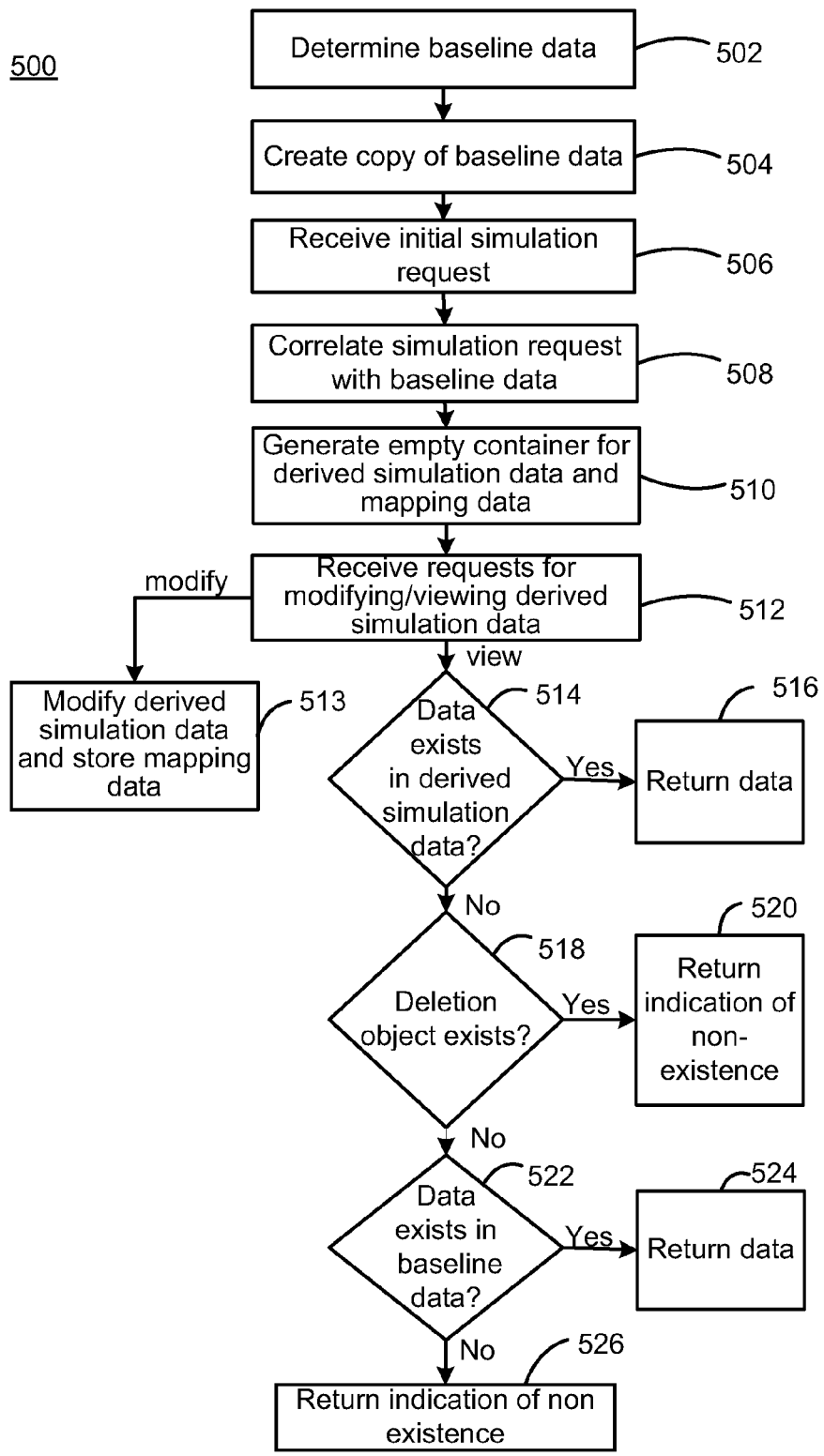
FIG. 5 is a flowchart illustrating more detailed examples of operations of the system of FIG. 1.

FIG. 5 is a flowchart 500 illustrating more detailed example operations of the system 100 of FIG. 1. In the example of FIG. 5, baseline data may be determined (502). For example, as described above, during an initial operation the baseline data may be defined and copied, e.g., using the baseline selector 124 and the baseline generator 120. In subsequent operations, as also described, the baseline data 130 may have been previously copied and stored as such, and may simply be identified and selected for use in generating additional derived simulations.

Thus, in specific examples of FIG. 5, it may be assumed that an initial use of the baseline data 130 is undertaken, so that the baseline generator 120 may create and store the baseline data 130 as a copy of selected data from the planning database 106 (504). Subsequently, or in conjunction therewith, one or more initial simulation requests may be received (506), e.g., by way of the interface mapper 122 and/or the simulator 126.

If necessary, the simulation request may be correlated with the baseline data (508). For example, it may occur that the baseline data 130 is created at a given time, and that the simulation request in question is not received until a subsequent time, so that during the interim, other baseline data datasets and/or associated simulation requests may have been received. Thus, as just referenced and is illustrated in the example of FIG. 5, it may be necessary to correlate an incoming simulation request of a specific corresponding baseline data dataset.

Subsequently, an empty container for derived simulation data and associated mapping data may be generated (510). For example, the interface mapper 122 may generate the empty container and also associate a unique identifier for the derived simulation in question.

Thereafter, as described above, the simulator 126 may execute conventional functionality in generating a desired simulation having specified parameters and characteristics, while the interface mapper 122 may be configured to relate the results of such simulation operations to the underlying baseline data 130. Specific techniques for generating derived simulation data and associated mapping data (e.g., the derived simulation 132 and the mapping data 136) are described herein, as specific detailed examples are provided below.

Requests for modifying and/or viewing the derived simulation data may thereafter be received (512). For example, a user may modify the derived simulation data and store resulting mapping data (513). As described, such modifications may occur in real-time (or near real-time), and may include creation of new data, deletion of existing data, or other modifications or updates to the baseline data that are logically provided based on the mapping data and without modifying the baseline data itself. Such modifications may occur as desired by, and received from, the user over a desired period(s) of time, as the user works in the context of a particular derived simulation.

Additionally and/or in conjunction with such modifications, the user of the application 108 may wish to utilize derived simulation, e.g., in order to view, explore and analyze possible business scenarios predicted to occur as part of the simulation process (514-526). For example, the user of the application 108 may submit a request related to the derived simulation 112 (and/or the derived simulation 114) and the interface mapper 122 may determine whether the requested data exists within the derived simulation data (514). If so, the requested data may be returned (516). For example, in the example of FIG. 3, it may occur that the user of the application 108 requests data related to the modified version of the first order in the example (i.e., the modified first order 308). Since data related to the modified first order 308 exists within the derived simulation 132, the user may be directly provided with the requested data therefrom.

If the requested data does not exist within the simulation data (514), then the interface mapper 122 may determine whether a corresponding deletion object exists (518). For example, again referring to the example of the derived simulation data 132 as illustrated in FIG. 3, it may occur that the user of the application 108 requests data related to the second order (i.e., the second order 304 of the baseline data 130). In this case, as described above, it occurs that the second order 304 has been deleted, and the deletion object 310 was created within the derived simulation data 132. Thus, an indication of deletion may be returned to the user of the application 108 (520).

In a case where no deletion object exists (518), however, the interface mapper 122 may determine whether the requested data exists within the baseline data 130 (522). For example, again with reference to the example of FIG. 3, the user of the application 108 may request information related to the third order 306. As shown in FIG. 3 and as described above, it is assumed in that example that the third order 306 is not affected by the derived simulation 112, and therefore is simply maintained as such within the baseline data 130. In such a case, consequently, the interface mapper 122 may simply return the third order 306 from the baseline data 130 to the user of the application 108 (524). Otherwise, the interface mapper 122 may return an indication of non-existence to the user (526).

Of course, FIG. 5 illustrates a simplified example of operations of the system 100 of FIG. 1, and it may be appreciated, as discussed above with respect to the flowchart 200 of FIG. 2, that the various operations of the flowchart 500 may occur concurrently, or in a different order than that shown, and may include more or fewer operations than there is specifically illustrated in the example of FIG. 5.

Consequently, it may be appreciated that the examples of FIGS. 4 and 5 illustrate that the interface mapper 122 may be implemented in conjunction with the database management system 104, and other components of the system 100 of FIG. 1, to provide the derived simulations 112, 114, as well as comparison 118 there between. For example, as referenced above, the database management system 104 may implement a specific API (e.g., including a specific subset of SQL functions), in which case the interface mapper 122 and associated components of the system 100 of FIG. 1 may implement a further subset of SQL functionality as a modified API operating in relation to the existing API of the database management system 104.

In the examples that follow, example API operations associated with the database management system 104 are provided. Thereafter, modified API functionalities which may be used by the interface mapper 122 and related components of the system 100 of FIG. 1 are described with respect to corresponding, underlying API operations of the database management system 104. In particular, operations of the locking module 142 and the shared memory 144 are discussed with respect to locking techniques associated with the database management system 104, and in the context of locking techniques used in conjunction with concurrent access by multiple users of one or both of the derived simulations 112, 114. Further, specific implementation details regarding the locking module 142 and the shared memory 144 are described and illustrated with respect to flowchart 600 of FIG. 6.

Thus, the following provide example API operations associated with the database management system 104 (referred to herein as "DBMS functions"), in implementations in which object-oriented or relational databases are used. In this context, the API functions may include the following functions, which are numbered first through eleventh, for ease of correspondence to corresponding functions described thereafter for additional or modified API functions for use according to the structures and functions described above with respect to FIGS. 1-5 (referred to herein as "modified DBMS function").

Thus, in a first DBMS function, object identifier (OID) access may be provided. E.g., each object in the database can be accessed by a unique identifier called OID. If there is no object with this OID, this is communicated to the caller. Whether OIDs have a global scope or whether they represent only an object in a certain object container or in a certain collection of object containers (see below in the third DBMS function) may vary. Within a relational database an OID access could, for example, be realized by an access via a unique primary key which plays the role of the OID.

In a second DBMS function, key access may be provided: E.g., objects in the database may have, in addition to their OID, another unique identifier, called the key. The access by this key may be called a key access. If there is no object with this key, this is communicated to the caller. Whether keys have a global scope or whether they represent only an object in a certain object container or in a certain collection of object containers (see below in the third DBMS function) may vary. Within a relational database, a key access could, for example, be realized by an access via column values representing a unique secondary index.

In a third DBMS function, object container iteration may be enabled. E.g., the objects in the database may be logically partitioned and organized in object containers. In such examples, each object container contains objects with a similar or identical structure. Whether objects have keys allowing key access, as just discussed, is a property of the underlying class container in such examples. The objects within an object container can be enumerated by an operation called object container iteration. Within a relational database an object container could be a table where the objects represent the rows of the table. In such an implementation an object container iteration could be realized as a full table scan.

In a fourth DBMS function, key range iteration may be provided. E.g., if an object container has the property that its objects have keys (see ii) it is possible to enumerate a subset of the objects belonging to the container by specifying a key range (i.e. a start key and an end key) which delivers only objects with keys between the start key and the end key. Within a relational database a key range iteration could for example be realized by a select statement with a between clause related to the column representing the key.

In a fifth DBMS function, locking of objects may be provided. E.g., objects may be locked in exclusive or shared mode. If a lock is requested which leads to a lock collision, this is communicated in a suitable way to the calling program. If a lock is requested for an object (specified by its OID or its key) which does not exist, this is communicated in a suitable way to the caller. Within a relational database an object lock may be realized by a row lock.

In a sixth DBMS function, creation of new objects may be provided. E.g., a new object is created in an object container specified by the caller. The OID of the new object is generated and administered by the database. If the container in which the new object is to be created has the property that all objects must have a key, the key of the object has to be provided by the caller. If an object with this key already exists in the target object container, this exception is communicated to the caller and the object creation fails. Within a relational database an object creation may be realized by an insert operation into the table representing the corresponding object container. Additionally, an administration component for the OID generation may be necessary.

In a seventh DBMS function, deletion of objects may be provided. E.g., an object specified by its OID or its key (for objects with keys, see above) is deleted from its container. If an object with the specified OID or key cannot be found, the deletion fails and this exception is communicated to the caller. Within a relational database an object deletion may be realized by a delete operation on the table row representing the object.

In an eighth DBMS function, changing objects may be provided. E.g., an object specified by its OID or its key (for objects with keys, see above) is changed, i.e., its attributes are changed. If an object with the specified OID or key cannot be found, the change operation fails and this exception is communicated to the caller. Prerequisite for a successful change operation is the previous or implicitly executed acquisition of an exclusive lock for the object. Within a relational database an object change may be realized by an update operation on the table row representing the object.

In a ninth DBMS function, creation of new empty object containers may be provided. E.g., within a relational database, creation of a new object container may be realized by creating a new empty table.

In a tenth DBMS function, transaction control functions may be provided. E.g., these functions may include functions like COMMIT WORK or ROLLBACK WORK which can be used to finish transactions.

In an eleventh DBMS function(s), additional enhancements to the first through tenth functions above may be provided. E.g., combinations of some or all of the functions or additional read functions (for example, for reading locking states, keys, OIDs etc. of objects).

As referenced above, such an API as just described may be realized by an encapsulated subset of SQL statements in a relational database. Another example implementation may include an object-oriented database system with a suitable native API.

As also described above, using the described derived simulations may be implemented by using these existing DBMS functions of the planning system, which are only modified such that another implementation of the same API is used, as described below with respect to corresponding first to eleventh modified DBMS functions. Such switching of the API implementation may be done very efficiently, for example, inside the API itself (if access to the source code of the API is available), or by encapsulating the API calls of the planning system coding inside a separate layer from which the original API or the modified version for working in a derived simulation may be called, as referenced above with respect to the example of FIG. 4.

In such examples, the modified API for working in a derived simulation may itself use the original API in such a way that read operations for unchanged objects are executed in the object containers of the baseline data, whereas read operations for changed objects are directed to appropriate object containers belonging to the derived simulation. Changing or locking operations and creating new objects lead to new entries in appropriate containers belonging to the derived simulation. Deletions of objects which exist in the baseline data are mapped to the creation of deletion entry objects in appropriate containers of the derived simulation representing these deletions. Every read-operation in a derived simulation may be examined as to whether a corresponding deletion entry object exists; in this case the requested object does not exist from a logical point of view. For deletion entries belonging to objects with keys, the deletion entries may therefore be found also by the keys of the original object.

In order to implement this idea it is necessary to introduce a mapping mechanism according to the interface mapper 122 and the mapping data 136, in which each object from the base simulation which is modified or deleted in the derived simulation is assigned the corresponding object or deletion entry object in the containers representing the derived simulation. Depending on the uniqueness of the OIDs, this mapping could for example be realized by a mapping between OIDs belonging to the original objects in the baseline data and the corresponding change entry objects and deletion entry objects belonging to the derived simulation. This mapping itself may be persisted in order to protect the derived simulation from loss of data in case of crashes and shutdown/restart events. This persistent mapping may be realized by keyed objects in object containers belonging to the derived simulation; the key would in this case bear the OID from the object in the baseline data. These mapping objects may also be used as "lock representatives" as described below.

As can be seen below the mapping mechanism may support an efficient reverse lookup, i.e., finding an object belonging to the baseline data by a given change entry object or deletion entry object belonging to a derived simulation. This could for example be achieved by a second mapping object whose key bears the OID of the change or deletion entry object.

Thus, in a first modified DBMS function, OID access may be provided. E.g., the ability to search an object with the given OID according the following or logically equivalent rules which define whether an object with the given OID does or does not exist from a logical point of view. Such rules may include, e.g., that if there is a deletion entry object for this OID belonging to the derived simulation, communicate to the caller that an object with this OID does not exist. If there is no deletion entry object, try to find an object logically belonging to this OID using the OID mapping belonging to the derived simulation. If the OID mapping does not contain an entry for this OID (neither by forward nor by reverse lookup) try to find an object with the given OID in the object containers belonging to the derived simulation and belonging to the baseline data If nothing can be found communicate to the caller that an object with this OID does not exist.

In a second modified DBMS function, key access may be provided. For example, the ability to search an object with the given key according to the following or logically equivalent rules which define whether an object with the given key does or does not exist from a logical point of view may be provided. Such rules may include an attempt to find an object with the given key in the object containers belonging to the derived simulation. If it cannot be found try to find a deletion entry object belonging to this key. If there is a deletion entry object for this key, communicate to the caller that an object with the given key does not exist. Otherwise try to find the object by key access within the object containers belonging to the baseline data. If nothing can be found communicate to the caller that an object with this key does not exist.

In a third modified DBMS function, object container iteration may be provided. For example, composition of the results of object container iterations in the object containers belonging to the derived simulation and the baseline data under appropriate application of the rules defined above in the first modified DBMS function.

In a fourth modified DBMS function, key container iteration may be provided. For example, composition of the results of key range iterations in the object containers belonging to the derived simulation and the baseline data may be enabled under appropriate application of the existence-rules defined above with respect to the second modified DBMS functions.

In a fifth modified DBMS function, locking of objects may be provided. For example, if the object to be locked (specified by its OID or its key) does not exist from a logical point of view according to the rules defined above in the first or second modified DBMS functions, it is communicated to the caller that the object does not exist. If the object to be locked does exist from a logical point of view and concurrent work on the same derived simulation shall be supported, the following mechanism (or a logically equivalent one) could be applied, as described below and illustrated with respect to FIG. 6.

Specifically, if there is neither a deletion entry object nor an OID-mapping entry for the object to be locked and the object exists in the object containers belonging to the derived simulation, the conclusion may be drawn that the object under consideration has been created in the derived simulation without a reference to a corresponding original object in the baseline data. In this case the lock operation may be applied directly to the object found in the derived simulation and the result may be communicated to the caller.

Figure 6:
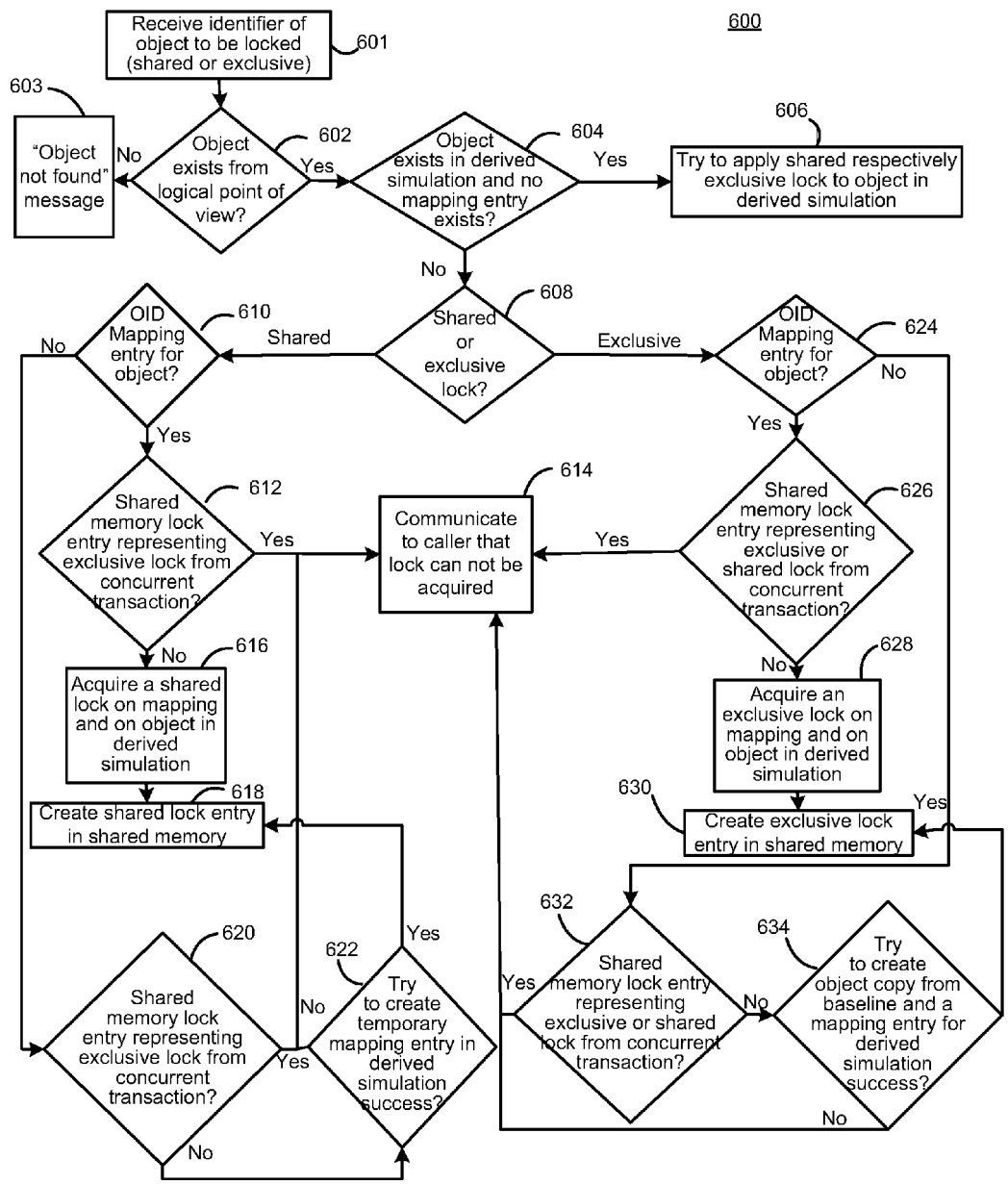
FIG. 6 is a flowchart illustrating example operations related to locking data during certain concurrent usages of the system of FIG. 1.

Otherwise, the operations of the flowchart 600 of FIG. 6 may be followed, and all concurrent lock requests related to the same logical object (i.e. to the same OID if the OID is globally unique) may be synchronized with a suitable synchronization method provided by the runtime of the system. The implementation of FIG. 6 may utilize the shared memory 144 and locking module 142 of FIG. 1, e.g., may use such a shared memory mechanism which allows creation of transient lock entries which can be read from any of the concurrent tasks or programs inside the system of FIG. 1 which is working on the same derived simulation.

As shown in FIG. 6, an identifier of an object to be locked may be received (601). If the object does not exist from a logical point of view (as described above with respect to FIG. 5) (602), then an "object not found" message may be sent (603) as described therein.

Otherwise, if a mapping entry for the locked object does not exist (604), the lock may be applied directly to the object (606), i.e. the object has been newly created in the derived simulation. If not, and if a shared lock shall be acquired (608) and there is an entry in the OID-mapping for the object under consideration (610), then a check may be performed as to whether there is already a shared memory lock entry representing an exclusive lock for this OID created by another concurrent transaction (612). If such an entry in the shared memory exists, communicate to the caller that the requested lock cannot be acquired (614). Otherwise, if such an entry in the shared memory does not exist (612), acquire a shared lock on the persistent OID-mapping related to the OID under consideration and additionally a shared lock on the object in the derived simulation which represents the object belonging to the OID (616). In the shared memory create a lock entry representing a shared lock for the OID under consideration (618). This shared memory entry has to be held until the end of the current transaction; on the finalizing COMMIT WORK or ROLLBACK WORK of the database system in the transaction under consideration it has to be deleted.

If a shared lock shall be acquired (608) and there is no entry in the OID-mapping for the object under consideration (610), then a check may be performed to determine whether there is already a shared memory lock entry representing an exclusive lock for this OID created by another concurrent transaction (620). If such an entry in the shared memory exists, communicate to the caller that the requested lock cannot be acquired (614). Otherwise, if such an entry in the shared memory does not exist, an attempt may be made to create in the derived simulation a temporary OID-mapping entry (622) (where temporary means in this context that this OID-mapping entry should immediately be removed after the trial, for example, if the database system supports subtransactions, by executing the creation of this entry within a subtransaction which is rolled back immediately.) If this creation of a temporary OID-mapping entry is not successful due to a duplicate key situation (i.e. another concurrent transaction might already have created such an OID-mapping entry for the OID under consideration which, however, cannot be seen directly due to the isolation level of the database system), communicate to the caller that the requested lock cannot be acquired (614). Otherwise, if the temporary OID-mapping entry can be created, create a lock entry representing a shared lock for the OID under consideration in the shared memory (618). This shared memory entry has to be held until the end of the current transaction; on the finalizing COMMIT WORK or ROLLBACK WORK of the database system in the transaction under consideration it has to be deleted.

If an exclusive lock shall be acquired (608) and there is an entry in the OID-mapping for the object under consideration (624), then a check may be performed to determine whether there is already any shared memory lock entry representing an exclusive or shared lock for this OID created by another concurrent transaction (626). If such an entry in the shared memory exists, communicate to the caller that the requested lock cannot be acquired (614). Otherwise, if such an entry in the shared memory does not exist, acquire an exclusive lock on the persistent OID-mapping related to the OID under consideration and additionally an exclusive lock on the object in the derived simulation which represents the object belonging to the OID (628). In the shared memory create a lock entry representing an exclusive lock for the OID under consideration (630). This shared memory entry has to be held until the end of the current transaction; on the finalizing COMMIT WORK or ROLLBACK WORK of the database system in the transaction under consideration it has to be deleted.

If an exclusive lock shall be acquired (608) and there is no entry in the OID-mapping for the object under consideration (624), then a check may be performed to determine whether there is already any shared memory lock entry representing an exclusive or shared lock for this OID created by another concurrent transaction (632). If such an entry in the shared memory exists, communicate to the caller that the requested lock cannot be acquired (614). Otherwise, if such an entry in the shared memory does not exist, try to create in the derived simulation a copy of the corresponding object from the baseline data and also an OID-mapping entry (634). If this creation of the OID-mapping entry is not successful due to a duplicate key situation (i.e. another concurrent transaction might already have created such an OID-mapping entry for the OID under consideration which, however, cannot be seen directly due to the isolation level of the database system), communicate to the caller that the requested lock cannot be acquired (614). Otherwise, if the new OID-mapping entry can be created, create a lock entry representing an exclusive lock for the OID under consideration in the shared memory (630). This shared memory entry has to be held until the end of the current transaction; on the finalizing COMMIT WORK or ROLLBACK WORK of the database system in the transaction under consideration it has to be deleted.

In a sixth modified DBMS function, new objects may be created. For example, new objects may be created in the object containers belonging to the derived simulation.

In a seventh modified DBMS function, deletion of objects may be enabled. For example, the original database API may be used such that lock operations and object creations/deletions and changes are done only in the object containers belonging to the derived simulation, in such a way that as a result, the rules from the first and second (modified) DBMS functions would identify the object from a logical point of view as non-existing. In this example, this means for objects for which an OID-mapping entry exists, that this OID-mapping entry has to be replaced by corresponding deletion entry objects.

In an eighth modified DBMS function, changing of object may be provided. For example, if an object shall be changed for which a representative already exists in the object containers belonging to the derived simulation, the change operation can be done on this representative. Otherwise a copy of the original object from the baseline data may be created in the derived simulation together with a corresponding OID-mapping entry. As a prerequisite the necessary locking operations may be executed.

In a ninth modified DBMS function, creation of new empty object containers may be provided. For example, new object containers belonging to the derived simulation can be created by using the corresponding original API functions.

In a tenth modified DBMS function, transaction control functions may be provided. For example, these can be implemented by simply calling the corresponding original API functions, which in the case of non-trivial locking mechanisms (e.g., as in FIG. 6) may be enhanced by transient cleanup functionalities for the synchronization and shared memory objects.

In an eleventh modified DBMS function, additional enhancements may be provided. For example, combinations of the above functions, or additional read functions, may be implemented accordingly by using the corresponding operations of the modified API and associated functionalities described above as building-blocks.

Thus, such a modified API may be implemented so as to not change or lock objects within object containers belonging to the baseline data, and so as not to create new objects in object containers belonging to the baseline data. Further, in cases where concurrent work on the same derived simulation is supported, additional transient mechanisms like synchronization measures and/or shared memory techniques may be needed, as described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one processor;
   a non-transitory computer-readable medium storing instructions, when executed, are configured to implement,
   a baseline generator configured to cause the at least one processor to generate baseline data including copying selected planning data from a planning database to produce the baseline data, the baseline data being a common data set used in generating two or more derived simulations including a first derived simulation and a second derived simulation, the first and second derived simulations occurring at different points in time with one or more changes to the planning data in the planning database in between the first derived simulation and the second derived simulation;
   an interface mapper configured to cause the at least one processor to
      receive modifying requests associated with changes to the first derived simulation,
      determine affected entries within the baseline data that are affected by the modifying requests,
      store simulation entries within a first derived simulation dataset, the simulation entries corresponding to the affected entries within the baseline data, and
      provide a mapping between the simulation entries within the first derived simulation dataset and the affected entries within the baseline data;
   a simulator configured to cause the at least one processor to provide the first derived simulation in response to the modifying requests and based on the mapping without affecting the baseline data,
   wherein the simulator is further configured to cause the at least one processor to provide the second derived simulation based on the baseline data used to generate the first derived simulation and on secondary requests without affecting the baseline data, the second derived simulation including secondary affected entries mapped to secondary affected entries of the baseline data according to a secondary mapping;

a comparator configured to cause the at least one processor to provide a comparison between the first derived simulation and the second derived simulation; and a locking module configured to cause the at least one processor to implement a shared memory for locking entries of the first derived simulation during concurrent usages of the first derived simulation including determining that an entry for an object to be locked is included within the simulation entries of the first derived simulation dataset without a reference to a corresponding original object in the baseline data, and applying the lock to the object found in the first derived simulation dataset.

2. The system of claim 1, wherein the simulator is further configured to cause the at least one processor to provide the first derived simulation in response to a viewing request specifying non-affected entries within the baseline data.

3. The system of claim 1, wherein the baseline data is maintained in read-only form.

4. The system of claim 1, wherein the simulator is further configured to cause the at least one processor to provide the first derived simulation including receiving a viewing request for viewing a selected affected entry, and providing the corresponding simulation entry based on the mapping.

5. The system of claim 1, wherein the simulator is further configured to cause the at least one processor to provide the first derived simulation including receiving a viewing request for viewing a selected affected entry which is logically deleted within the first derived simulation, and providing the corresponding simulation entry based on the mapping and indicating non-existence of the requested entry.

6. The system of claim 1, wherein the simulator is further configured to cause the at least one processor to provide the first derived simulation including creating a new entry for inclusion within the first derived simulation based on the modifying request.

7. The system of claim 1, wherein the interface mapper includes a baseline selector configured to cause the at least one processor to define the baseline data within the planning database for the baseline generator, based on user input.

8. The system of claim 1, wherein the interface mapper is configured to cause the at least one processor to create, in response to a creation request for the first derived simulation, at least one empty container and associated identifier for the first derived simulation, for storage therein of the simulation entries and mapping data.

9. A computer-implemented method comprising:

generating baseline data including copying selected planning data from a planning database to produce the baseline data, the baseline data being a common data set used in generating two or more derived simulations including a first derived simulation and a second derived simulation, the first and second derived simulations occurring at different points in time with one or more changes to the planning data in the planning database in between the first derived simulation and the second derived simulation;

receiving modifying requests associated with changes to the first derived simulation;

determining affected entries within the baseline data that are affected by the modifying requests;

storing simulation entries within a first derived simulation dataset, the simulation entries corresponding to the affected entries within the baseline data;

providing a mapping between the simulation entries within the first derived simulation dataset and the affected entries within the baseline data;

providing the first derived simulation in response to the modifying requests and based on the mapping without affecting the baseline data;

providing the second derived simulation based on the baseline data used to generate the first derived simulation and on secondary requests without affecting the baseline data, the second derived simulation including secondary affected entries mapped to secondary affected entries of the baseline data according to a secondary mapping;

providing a comparison between the first derived simulation and the second derived simulation; and implementing a shared memory for locking entries of the first derived simulation during concurrent usages of the first derived simulation including determining that an entry for an object to be locked is included within the simulation entries of the first derived simulation dataset without a reference to a corresponding original object in the baseline data, and applying the lock to the object found in the first derived simulation dataset.

10. The method of claim 9, further comprising providing the first derived simulation including receiving a viewing request for viewing a selected affected entry, and providing the corresponding simulation entry based on the mapping.

11. A computer program product, the computer program product being tangibly embodied on a non-transitory computer-readable medium and comprising instructions that, when executed by at least one processor, are configured to perform operations including:

generate baseline data including copying selected planning data from a planning database to produce the baseline data, the baseline data being a common data set used in generating two or more derived simulations including a first derived simulation and a second derived simulation, the first and second derived simulations occurring at different points in time with one or more changes to the planning data in the planning database in between the first derived simulation and the second derived simulation;

receive modifying requests associated with changes to the first derived simulation;

determine affected entries within the baseline data that are affected by the modifying requests;

store simulation entries within a first derived simulation dataset, the simulation entries corresponding to the affected entries within the baseline data;

provide a mapping between the simulation entries within the first derived simulation dataset and the affected entries within the baseline data;

provide the first derived simulation in response to the modifying requests and based on the mapping without affecting the baseline data, provide the second derived simulation based on the baseline data used to generate the first derived simulation and on secondary requests without affecting the baseline data, the second derived simulation including secondary affected entries mapped to secondary affected entries of the baseline data according to a secondary mapping;

provide a comparison between the first derived simulation and the second derived simulation; and implement a shared memory for locking entries of the first derived simulation during concurrent usages of the first derived simulation including determining that an entry for an object to be locked is included within the simulation entries of the first derived simulation dataset without a reference to a corresponding original object in the baseline data, and applying the lock to the object found in the first derived simulation dataset.

12. The computer program product of claim 11, wherein the baseline data is maintained in read-only form.

13. The computer program product of claim 11, wherein the first derived simulation is provided including receiving a viewing request for viewing a selected affected entry, and providing the corresponding simulation entry based on the mapping.

14. The computer program product of claim 11, wherein the first derived simulation is provided including receiving a viewing request for viewing a selected affected entry which is logically deleted within the first derived simulation, and providing the corresponding simulation entry based on the mapping and indicating non-existence of the requested entry.

15. The computer program product of claim 11, wherein the first derived simulation is provided including creating a new entry for inclusion within the first derived simulation based on the modifying request.

\* \* \* \* \*